June 18, 1957     A. B. SKROMME     2,795,912
FORAGE HARVESTER
Filed Nov. 16, 1954                                                  2 Sheets—Sheet 2
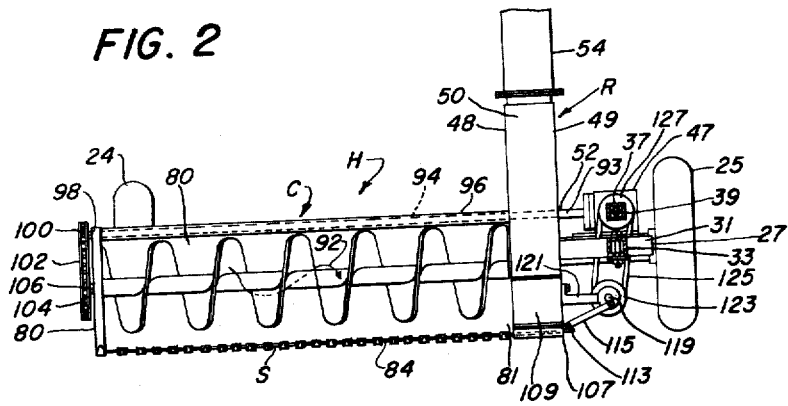
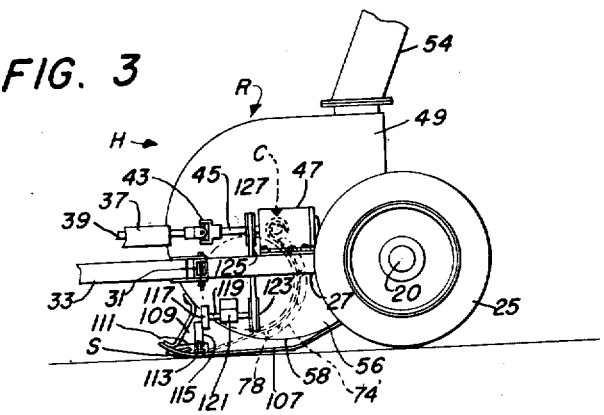
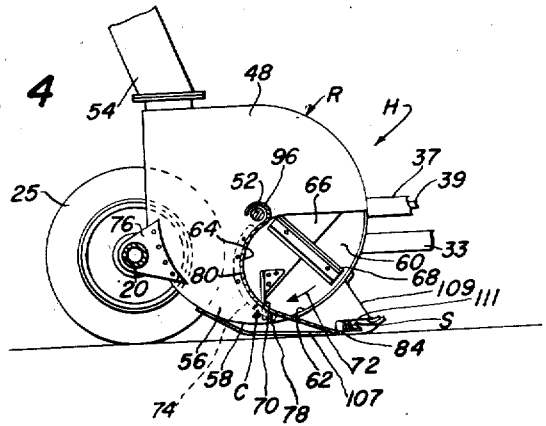
INVENTOR.
A. B. SKROMME

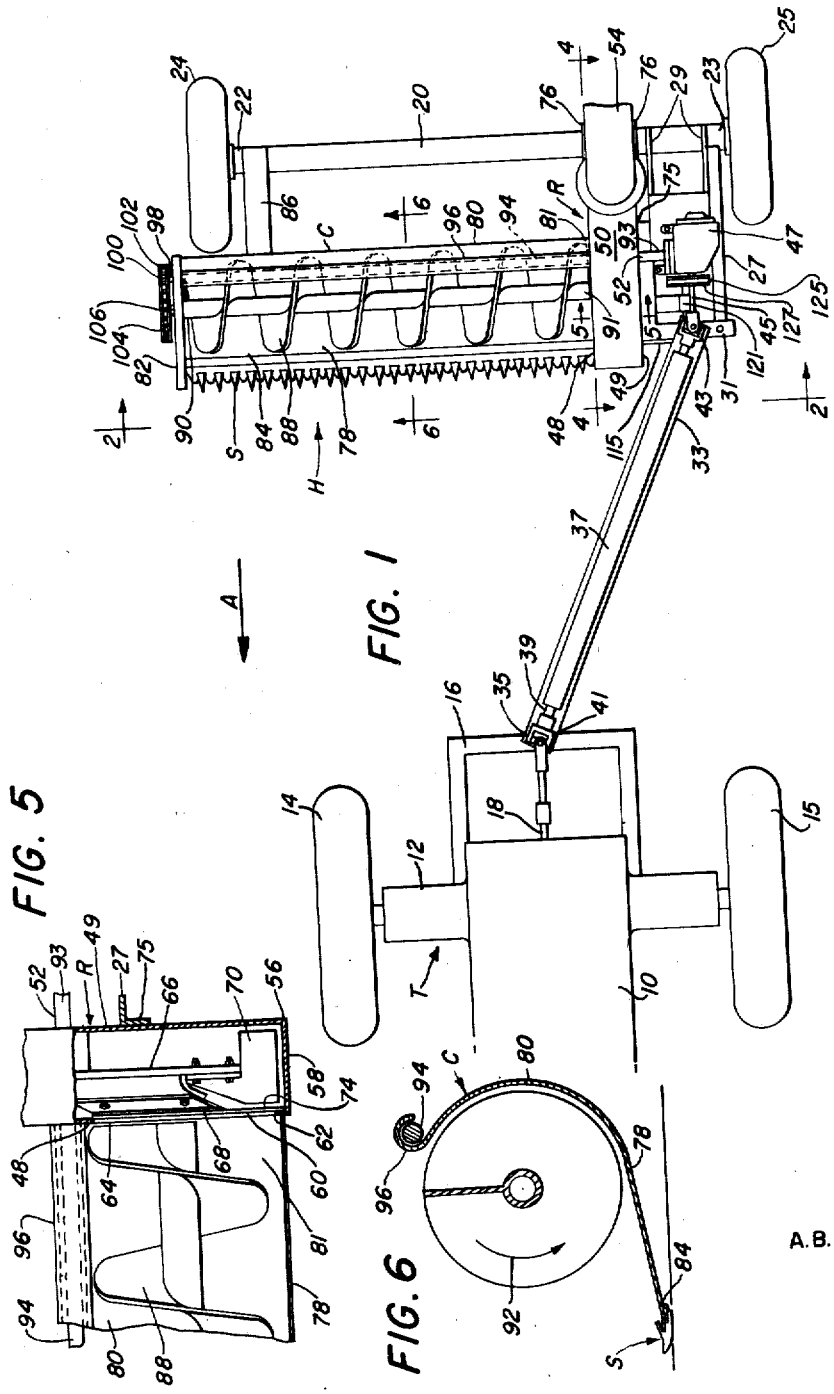

United States Patent Office 2,795,912
Patented June 18, 1957

2,795,912

FORAGE HARVESTER

Arnold B. Skromme, Ottumwa, Iowa, assignor to Deere Manufacturing Co., Dubuque, Iowa, a corporation of Iowa Application November 16, 1954, Serial No. 469,193

12 Claims. (Cl. 56—1)

This invention relates to a harvester and more particularly to a low-cost harvester embodying a unitary design comprising cutting mechanism, feeding mechanism and reducing mechanism.

The harvester belongs to the general class known as forage harvesters, characterized in the gathering of crops and the reduction of such crops for ensilage. Such machines are primarily of the one-operation type; that is, they operate over the field to sever the crops from the field and to reduce the crops substantially contemporaneously with the harvesting thereof, rather than first harvesting the crops and subsequently collecting and storing them.

The harvester provided according to the present invention comprises a simple and inexpensive wheeled frame carrying at one side thereof a rotor housing of the forage-harvester type, to which crops are fed by a transverse conveyor located behind a ground-proximate cutting mechanism. Specifically, the wheeled frame carries ahead of the axle between the wheels a transversely elongated auger trough having a bottom along the leading edge of which is a conventional sickle and operative in which trough is a coaxial auger feeding the severed crops to the inlet opening of a rotor housing carried at one side of the machine. The entire structure is built and operates in close proximity to the ground, being light in weight and draft and thereby economically useful with a low-power tractor. The auger conveyor and cutting mechanism is arranged ahead of and in balanced relationship with the wheels and in such manner that the wheels do not run over crops next adjacent to the swath being currently cut.

Various other important objects and desirable features inherent in and encompassed by the invention will become apparent as a preferred embodiment of the invention is disclosed in detail in the ensuing specification and accompanying sheets of drawings, the several figures of which are described immediately below.

Fig. 1 is a plan view of the harvester, shown in conjunction with the rear portion of a tractor.

Fig. 2 is a front view, partly in section, as seen substantially along the line 2—2 of Fig. 1.

Fig. 3 is an end view showing the harvester as it appears from the left-hand side of the machine.

Fig. 4 is a longitudinal sectional view as seen substantially along the line 4—4 of Fig. 1.

Fig. 5 is an enlarged fragmentary transverse sectional view as seen along the line 5—5 of Fig. 1.

Fig. 6 is an enlarge longitudinal sectional view as seen along the line 6—6 of Fig. 1.

As shown in Fig. 1, the harvester, bearing the general designation H, is towed by a tractor T, the tractor being of generally conventional construction and including a longitudinal central body 10 having a rear axle structure 12 at right- and left-hand ends of which are respectively carried right- and left-hand traction wheels 14 and 15. Here, as in the claims, the expressions "right-hand" and "left-hand" are used with reference to the position of an observer standing behind the machine and looking forwardly. The expressions are, of course, descriptive, since the parts could quite obviously be reversed without departing from the spirit of the invention.

The tractor has a rearwardly extending drawbar 16 and a longitudinally rearwardly extending power take-off shaft 18, both of which are not unconventional.

The harvester comprises a main elongated horizontal frame, here in the form of a tubular axle 20 having right- and left-hand ends or journals 22 and 23 on which are respectively mounted coaxial ground-engaging right- and left-hand wheels 24 and 25. An auxiliary frame 27 of relatively narrow transverse dimension is rigidly carried by the axle 20 and extends forwardly therefrom just to the right of the left-hand wheel 25. The auxiliary frame is appropriately rigidly secured to the axle as by brackets 29. The frame 27 has a transverse forward portion 31 located ahead of the fore part of the left-hand wheel 25 and forms means for the pivotal connection to the frame 27 of a forwardly extending draft tongue 33, the forward end of which includes a clevis, as at 35, for connection to the tractor drawbar 16. Mounted on or as a part of the tongue 33 is an elongated fore-and-aft extending propeller shaft housing 37 within which is carried a propeller shaft 39, the forward end of which is connected by a universal joint 41 to the power take-off shaft 18 of the tractor T.

The rear end of the propeller shaft 39 has a universal joint connection 43 with a fore-and-aft extending input shaft 45 that enters a gear housing 47. This mechanism comprises power input means mounted on the frame 27, since the gear housing 47 is rigidly carried on the auxiliary frame 27 at a location ahead of and approximately at the level of the axis of the wheels 24 and 25 as represented by the transverse frame or axle 20. Drive gearing (not shown) contained within the power input housing 47 serves to drive the component parts of the harvester, the details of which will presently appear.

The relationship of the tractor T and harvester H as shown in Fig. 1 represents the transport relationship between the two. In normal operation, the harvester H would be offset to the right of the tractor, the draft tongue 33 being convenionally pivoted to the front end 31 of the auxiliary harvester frame 27 for angular adjustment in a transverse horizontal plane to accommodate the offset. Hence, the harvester wheels 24 and 25 will not track with the tractor wheels 14 and 15 but rather will run in parallel paths to the right of and parallel to the path traveled by the right-hand traction wheel 14, thereby enabling operation of the organization without trampling of the uncut crops by the tractor. The tractor and harvester will proceed or advance forwardly, in the direction indicated by the arrow A.

A crop-treating or rotor housing R, of relatively narrow transverse dimension, is located just to the right of the auxiliary frame 27, being thus in close proximity to the left-hand harvester wheel 25. This housing, as is somewhat conventional in forage harvesters, is of substantially circular shape, having right-hand and left-hand upright fore-and-aft walls 48 and 49 spaced apart and joined by a peripheral wall or band 50, the circular shape of the housing being accomplished about a transverse horizontal housing axis represented here by a rotor shaft 52. The departure of the walls 48 and 49 from a generally circular shape occurs simultaneously with the provision on the housing of a tangentially upwardly directed discharge spout 54 which, as is customary, is directed upwardly and rearwardly (not shown) for directing from the housing and into a trailing wagon crops reduced by the housing after such crops have been severed from the field and fed to the housing.

As will be seen, the rotor housing axis, as represented by the rotor shaft 52, is located ahead and approximately at the level of the wheel axis, being somewhat above that level but the point being that it is relatively low. The housing therefore includes a lower semicircular part 56 that depends below the housing axis and that includes a lower portion 58 in close proximity to the ground (Figs. 3 and 4). The right-hand housing wall 48 is provided with an inlet opening 60, which opening faces to the right and is in the semicircular housing part 56 and ahead of the housing axis. Stated otherwise, the inlet opening 60 is in that quadrant of the housing located ahead of and below the housing axis as represented by the rotor shaft 52. The opening 60 has a bottom edge 62 approximate to the ground-proximate lower portion 58 of the housing and further has a rear edge portion 64 adjoining and rising from the bottom edge, giving the opening a shape as best shown in Fig. 4 and placing the opening primarily in the lower forward quadrant of the housing.

Carried for rotation within the housing R is a rotor 66 having thereon crop-treating or handling means comprising a plurality of radial knives 68 and crop-engaging paddles 70. For present purposes, it may be assumed that the rotor 66 is of any conventional design, as represented primarily by the U. S. patent to Tuft 2,457,951; however, the details are relatively unimportant. The rotor 66 is suitably fixed to the rotor shaft 52 and is arranged for rotation in the direction of the arrow 72 (Fig. 4) so that during operation the knives 68 operate in a radial plane parallel to and just inwardly to the left of the right-hand housing wall 48, the knives sweeping in succession past the rear upright edge 64 of the feed or inlet opening 60.

A shear bar 74 in the form of an upright member is rigidly secured to the right-hand housing wall 48 and lies along the upright edge 64 of the opening 60 for cooperation with the cutter knives 68 as the rotor 66 rotates, thus effecting reduction of crops fed into the housing R via the inlet opening. The paddles operate, as is customary, to facilitate the discharge of reduced crops upwardly through the discharge spout 54.

Rigidity in construction is afforded by any appropriate means mounting the housing R on the axle or frame 20 as well as on the auxiliary frame 27, which means is accomplished by securing the housing to the axle 20 as by brackets 76 and as by securing the housing left-hand wall 49 to an inner angle 75 of the auxiliary frame 27 (Fig. 5).

A transversely elongated auger or conveyor trough C is positioned ahead of and in parallelism with the axle 20 and is coaxial with the inlet opening 60 of the rotor housing R. Because of this relationship, the conveyor trough C is at a relatively low level and has a bottom 78 proximate to the ground and leading to the bottom 62 of the opening 60, and further includes an upright rear or back edge 80 adjoining the rear or back edge portion 64 of the opening 60. The conveyor trough thus has a left-hand end 81 proximate to the rotor housing R and a right-hand end 82 proximate to the right-hand harvester wheel 24, being in this case extended rightwardly beyond the wheel 24 so that the wheel is leftwardly inwardly of a crop swath determined by the transverse width of cutting mechanism in the form of a sickle bar S coextensive with and carried by a front leading edge 84 of the auger trough bottom. The right-hand end portion of the auger trough C is appropriately rigidly connected to the axle 20, as by a supporting member 86.

A conveyor in the form of an auger 88 is coaxially coextensive with the auger trough C and is appropriately journaled therein at its right-hand end, as at 90, the left-hand end of the auger, as at 91, being unsupported, which is not unconventional. The auger rotates in the direction of the arrow 92 and serves to move crops leftwardly along the auger trough and into the rotor housing inlet opening 60, such crops being severed from the ground by the sickle S as the machine moves forwardly.

The severed crops, of course, move rearwardly onto the bottom 78 of the auger trough as the machine advances.

The rotor shaft 52 has a left-hand shaft extension 93 which enters the power input means housing 47 to receive power therefrom. The rotor shaft has a right-hand extension 94 contained within a shield or shielding portion 96 carried along the back wall 80 of the auger trough 60, this shaft extension projecting at the right-hand end of the machine as a right-hand shaft portion 98 and having thereon a drive sprocket 100 which is connected by a chain 102 to a driven sprocket 104 fixed to a right-hand auger shaft portion coaxial with the auger, the sprockets 100 and 104 and the drive chain 102 comprising drive means interconnecting the shaft portion 98 and an extension 106 of the auger 88. The shielding of the shaft extension 94, as at 96, constitutes a safety measure as well as preventing the wrapping of crops on the shaft.

A fore-and-aft support 107 is connected at its rear end to the rotor housing bottom portion 56 and extends forwardly to serve as an inner shoe for the sickle S. In addition, the support 107 serves as a ground-engaging support to sustain the harvester when it is detached from the tractor. The forward portion of the support 107 is connected to a forward part of the rotor housing by an upright supporting member 109, which member is imperforate, except for a small opening 111, and thus serves as a divider associated with the inner end of the sickle S. The purpose of the opening 111 is to accommodate a transverse knife head 113 for the sickle S, which knife head is driven by a pitman 115 from an eccentric 117 fixed to a short fore-and-aft extending shaft 119 that is journaled in a bearing 121 carried on the left-hand side wall 49 of the rotor housing R. The end of the shaft 119 opposite to the eccentric 117 carries a sheave 123 which is driven by a belt 125 from a sheave 127 fixed to the input shaft 45 between the universal joint 43 and the input housing 47. Thus, all the component moving parts of the harvester are driven from the power input means 47 which derives its power in the first instance from the tractor power take-off shaft 18. Of course, a separate power plant could be mounted on the auxiliary frame 27, from which the drive could be taken as well as in the manner shown here.

In normal operation, the harvester H is drawn over the field behind the tractor T in offset relationship to the right-hand side of the tractor, as previously explained. The sickle S cuts a swath of crops and the severed crops move rearwardly onto the bottom 78 of the auger trough C as the machine advances. Simultaneously, the conveyor or auger 88 feeds the crops to the left and through the inlet opening 60 into the rotor housing R. The crops are further reduced by the crop-treating means comprising the knives 68 on the rotor 66 and the paddles 70 on the rotor 66 propel the reduced crops upwardly and outwardly through the spout 54 for receipt by a trailing vehicle (not shown) customarily towed by the harvester. The over-all arrangement is such that all the operating parts are relatively close to the ground, giving the machine a low center of gravity and making it easy to pull by a tractor of low power. The general nature of the construction is such that it is simply designed and therefore may be inexpensively constructed and marketed. The moving parts are few and maintenance problems are accordingly reduced.

Various other features of the invention not categorically enumerated will undoubtedly occur to those versed in the art, as will various modifications and alterations in the preferred embodiment of the invention disclosed, all of which may be achieved without departing from the spirit and scope of the invention.

What is claimed is:

1. A harvester adapted to advance over a field of crops, comprising: an elongated horizontal frame disposed with its length transverse to the line of advance and having opposite right- and left-hand ends; right- and left-hand coaxial wheels journaled respectively on said right- and left-hand ends and sustaining the frame; a rotor housing rigidly carried by and ahead of the frame and closely spaced laterally from and just to the right of the left-hand wheel, said housing being of generally circular shape about a transverse horizontal housing axis located ahead and a transverse horizontal housing axis located ahead and approximately at the level of the wheel axis, said housing having a semicircular part depending below the housing axis in close proximity to the ground, said housing having an upright fore-and-aft extending right-hand wall provided with an inlet opening facing to the right and in the aforesaid semicircular housing part and ahead of the housing axis, said right-hand wall providing said opening with a bottom edge and a rear edge adjoining and rising from said bottom edge; an elongated horizontal auger trough having a left-hand end communicating with the housing inlet opening and further having a right-hand end positioned ahead of and transversely rightwardly beyond the right-hand wheel, said trough having a ground-proximate bottom substantially at the level of the bottom edge of the inlet opening and a generally upright back wall adjoining the rear edge of the inlet opening, said bottom of the trough having a transverse leading edge parallel to the ground and coextensive with the auger trough at a level below that of the back wall; cutting mechanism carried by the trough along the leading edge thereof and operative to sever crops from the ground to cause such crops to move rearwardly into the trough as the harvester advances; and an auger coaxially coextensive with and carried in the auger trough for moving trough-contained crops to the left and into the rotor housing via the aforesaid inlet opening.

2. The invention defined in claim 1, including: a rotor journaled within the housing on the housing axis and having crop-handling means thereon including knives operative in a radial cutting plane parallel to and just to the left of the housing right-hand wall; said rotor being rotatable in a direction such that the knives sweep rearwardly past the rear edge portion of the inlet opening; and a shear member carried by the housing right-hand wall along said rear edge portion of the opening for cooperation with the knives to cut crops fed into said opening.

3. The invention defined in claim 1, including: an auxiliary frame of relatively narrow transverse dimension interposed between the left-hand wheel and the rotor housing and rigid on the elongated frame in substantial transverse alinement with the housing axis; a rotor carried in the housing on the housing axis and including a left-hand coaxial shaft extension proximate to the auxiliary frame; and power input means carried by the auxiliary frame and connected to the rotor shaft left-hand extension.

4. The invention defined in claim 1, including: a rotor carried in the housing on the housing axis and having a coaxial rotor shaft extension projecting rightwardly in parallelism with the trough to a right-hand shaft portion rightwardly of the right-hand wheel; a right-hand shaft portion connected coaxially to the auger and projecting rightwardly beyond the right-hand wheel; and drive means interconnecting said shaft portions.

5. The invention defined in claim 4, including: an auxiliary frame of relatively narrow transverse dimension interposed between the left-hand wheel and the rotor housing and rigid on the elongated frame in substantial transverse alinement with the housing axis; a left-hand rotor shaft extension coaxial with the rotor and projecting leftwardly of the housing into proximity to the auxiliary frame; and power input means carried by the auxiliary frame and connected to the rotor shaft left-hand extension.

6. A harvester adapted to advance over a field of crops, comprising: an elongated horizontal frame disposed with its length transverse to the line of advance and having opposite right- and left-hand ends; right- and left-hand coaxial wheels journaled respectively on said right- and left-hand ends and sustaining the frame; a rotor housing rigidly carried by and ahead of the frame and closely spaced laterally from and just to the right of the left-hand wheel, said housing being of generally circular shape about a transverse horizontal housing axis located ahead and approximately at the level of the wheel axis, said housing having a semicircular part depending below the housing axis in close proximity to the ground, said housing having an upright fore-and-aft extending right-hand wall provided with an inlet opening facing to the right and in the aforesaid semicircular housing part and ahead of the housing axis, said right-hand wall providing said opening with a bottom edge and a rear edge adjoining and rising from said bottom edge; an elongated horizontal conveyor trough having a left-hand end communicating with the housing inlet opening and further having a right-hand end proximate to the right-hand wheel, said trough having a ground-proximate bottom substantially at the level of the bottom edge of the inlet opening and a generally upright back wall adjoining the rear edge of the inlet opening, said bottom of the trough having a transverse leading edge at a level below that of the back wall and parallel to the ground and coextensive with the trough; cutting mechanism carried by the trough along and generally coextensive with the leading edge thereof and operative to sever crops from the ground to cause such crops to move rearwardly into the trough as the harvester advances; and an elongated conveyor coextensive with and carried in the trough for moving trough-contained crops to the left and into the rotor housing via the aforesaid inlet opening.

7. The invention defined in claim 6, including: a rotor carried in the housing on the housing axis and having a coaxial rotor shaft extension projecting rightwardly in parallelism with the trough to a right-hand shaft portion proximate to the right-hand wheel; a conveyor shaft portion proximate to the right-hand wheel and connected to the conveyor; and drive means interconnecting said shaft portions.

8. The invention defined in claim 6, including: a fore-and-aft support connected to the lower portion of the housing and extending forwardly and connected to the conveyor trough.

9. A harvester adapted to advance over a field of crops, comprising: an elongated horizontal frame having its length transverse to the line of advance and including opposite right- and left-hand ends; right- and left-hand wheels coaxial on a transverse axis spaced closely above the ground and journaled respectively on said right- and left-hand ends and sustaining the frame; a rotor housing rigidly carried by and ahead of the frame and closely spaced laterally from and just to the right of the left-hand wheel, said housing being of generally circular shape about a transverse horizontal housing axis located ahead of the wheel axis, said right-hand wall providing said housing with an upright fore-and-aft extending right-hand wall provided with a rightwardly facing inlet opening, said opening having a bottom edge and a rear edge adjoining and rising from said bottom edge, said housing having a generally tangential discharge spout; a blower rotor in the housing for receiving crops from the inlet opening and for expelling such crops through the discharge spout; an elongated horizontal auger trough having a left-hand end communicating with the housing inlet opening and further having a right-hand end proximate to the right-hand wheel, said trough having a bottom substantially at the level of the bottom edge of the inlet opening and a generally upright back wall adjoining the rear edge of the inlet opening, said bottom of the trough having a generally coextensive transverse leading edge parallel to the ground at a level below that of the back wall; cutting mechanism carried by the trough coextensively with the leading edge thereof and operative to sever crops from the ground to cause such crops to move rearwardly into the trough as the harvester advances; and an elongated auger coaxially coextensive with and carried in the auger trough for moving trough-contained crops to the left and into the rotor housing via the aforesaid inlet opening.

10. The invention defined in claim 9, including: a rotor carried in the housing on the housing axes and having a coaxial rotor shaft extension projecting rightwardly in parallelism with the trough to a right-hand shaft portion proximate to the right-hand wheel; a right-hand shaft portion connected coaxially to the auger and proximate to the right-hand wheel; and drive means interconnecting said shaft portions.

11. The invention defined in claim 10, including: shield means carried by and along the back wall of the auger trough and at least partly enclosing the rotor shaft extension between the housing and the right-hand wheel.

12. A harvester adapted to advance over a field of crops, comprising: an elongated horizontal frame disposed with its length transverse to the line of advance and having opposite right- and left-hand ends; right- and left-hand coaxial wheels journaled respectively on said right- and left-hand ends and sustaining the frame; a crop-treating housing rigidly carried by the frame adjacent to the left-hand wheel, said housing having an inlet opening facing to the right and located closely proximate to the ground, said housing providing said opening with a substantially horizontal fore-and-aft bottom portion and a rear edge portion adjoining and rising from said bottom edge, said housing having a generally tangential discharge spout; a blower rotor in the housing for receiving crops from the inlet opening and for expelling such crops through the discharge spout; an elongated horizontal auger trough transversely alined and communicating with the housing inlet opening and having a right-hand end positioned ahead of and transversely rightwardly beyond the right-hand wheel, said trough having a ground-proximate bottom substantially at the level of the bottom edge of the inlet opening and a generally upright back wall adjoining the rear edge portion of the inlet opening, said bottom of the trough having a transverse leading edge parallel to the ground and coextensive with the auger trough; cutting mechanism carried by the trough along the leading edge thereof and operative to sever crops from the ground to cause such crops to move rearwardly into the trough as the harvester advances; and an elongated auger coaxially coextensive with and carried in the auger trough for moving trough-contained crops to the left and into the housing via the aforesaid inlet opening.

References Cited in the file of this patent

UNITED STATES PATENTS

| | | |
|---|---|---|
| 2,177,911 | Sommerfeld | Oct. 31, 1939 |
| 2,503,416 | Russell | Apr. 11, 1950 |
| 2,605,800 | Mateu | Aug. 5, 1952 |
| 2,677,550 | Berger | May 4, 1954 |
| 2,758,435 | Lundell | Aug. 14, 1956 |

FOREIGN PATENTS

| | | |
|---|---|---|
| 260,241 | Switzerland | July 16, 1949 |

UNITED STATES PATENT OFFICE

CERTIFICATE OF CORRECTION

Patent No. 2,795,912                          June 18, 1957

Arnold B. Skromme

It is hereby certified that error appears in the printed specification of the above numbered patent requiring correction and that the said Letters Patent should read as corrected below.

Column 5, line 30, for "adfvances" read --advances--; column 6, line 56, beginning with "said right-hand" strike out all to and including "bottom edge" in line 59, same column, and insert instead --said housing having an upright fore-and-aft extending right-hand wall provided with a rightwardly facing inlet opening, said right-hand wall providing said opening with a bottom edge--.

Signed and sealed this 22nd day of October 1957.

(SEAL)
Attest:
KARL H. AXLINE

Attesting Officer

ROBERT C. WATSON
Commissioner of Patents